(12) United States Patent
Negishi et al.

(10) Patent No.: US 12,541,250 B2
(45) Date of Patent: Feb. 3, 2026

(54) VIRTUAL SPACE IMAGE GENERATION DEVICE GENERATES A VIRTUAL SPACE BASED ON MOVEMENT OF A USER'S VIEWPOINT AND METHOD

(71) Applicants: SUZUKI MOTOR CORPORATION, Hamamatsu (JP); National University Corporation Yokohama National University, Yokohama (JP)

(72) Inventors: Daisuke Negishi, Hamamatsu (JP); Hidenori Horita, Hamamatsu (JP); Katsunori Okajima, Yokohama (JP); Shumpei Onuki, Yokohama (JP)

(73) Assignees: SUZUKI MOTOR CORPORATION, Hamamatsu (JP); NATIONAL UNIVERSITY CORPORATION YOKOHAMA NATIONAL UNIVERSITY, Yokohama (JP)

( * ) Notice: Subject to any disclaimer, the term of this patent is extended or adjusted under 35 U.S.C. 154(b) by 0 days.

(21) Appl. No.: 18/695,067

(22) PCT Filed: Mar. 22, 2022

(86) PCT No.: PCT/JP2022/012969
§ 371 (c)(1),
(2) Date: Mar. 25, 2024

(87) PCT Pub. No.: WO2023/053516
PCT Pub. Date: Apr. 6, 2023

(65) Prior Publication Data
US 2024/0393875 A1 Nov. 28, 2024

(30) Foreign Application Priority Data
Sep. 30, 2021 (JP) .................. 2021-161258

(51) Int. Cl.
*G06F 3/01* (2006.01)
*G06T 19/00* (2011.01)

(52) U.S. Cl.
CPC .............. *G06F 3/013* (2013.01); *G06T 19/00* (2013.01)

(58) Field of Classification Search
None
See application file for complete search history.

(56) References Cited

U.S. PATENT DOCUMENTS

| 5,889,529 A * | 3/1999 | Jones ................. G06T 3/40 345/660 |
| 9,766,697 B2 | 9/2017 | Inomata |

(Continued)

FOREIGN PATENT DOCUMENTS

| JP | 2017-058493 A | 3/2017 |
| JP | 2017-138701 A | 8/2017 |

(Continued)

OTHER PUBLICATIONS

International Search Report dated Jun. 14, 2022 issued in International Application No. PCT/JP2022/012969, with English Translation.

(Continued)

*Primary Examiner* — Kirk W Hermann
(74) *Attorney, Agent, or Firm* — TROUTMAN PEPPER LOCKE LLP

(57) ABSTRACT

A virtual space image generation device generates a virtual space image including a visibility change region in which a visibility changes based on movement of a viewpoint of a user. The virtual space image generation device includes an image generation unit that generates the virtual space image in which a transition completion time period required for transition of a visibility of the visibility change region (Continued)

between a first state and a second state different from the first state changes based on a predetermined condition, when the viewpoint of the user moves.

18 Claims, 8 Drawing Sheets

(56) References Cited

U.S. PATENT DOCUMENTS

| | | | |
|---|---|---|---|
| 10,409,365 | B2 | 9/2019 | Inomata |
| 2017/0076496 | A1 | 3/2017 | Inomata et al. |
| 2017/0221185 | A1* | 8/2017 | Inomata .................... G06T 5/70 |
| 2017/0287112 | A1* | 10/2017 | Stafford ................. G06F 3/013 |
| 2017/0364146 | A1* | 12/2017 | Inomata ................. G06F 3/012 |
| 2020/0034993 | A1 | 1/2020 | Croxford et al. |
| 2020/0132996 | A1* | 4/2020 | Yokota .................... G06F 3/013 |
| 2021/0096644 | A1* | 4/2021 | Wang ..................... H04N 19/17 |
| 2021/0349675 | A1* | 11/2021 | Noda ..................... G06F 3/0304 |
| 2022/0092862 | A1* | 3/2022 | Faulkner ................... G06T 7/20 |
| 2022/0317765 | A1* | 10/2022 | Ikeda ..................... G09G 3/003 |

FOREIGN PATENT DOCUMENTS

| | | | |
|---|---|---|---|
| WO | 2018/175625 | A1 | 9/2018 |
| WO | 2020/049838 | A1 | 3/2020 |

OTHER PUBLICATIONS

Extended European Search Report issued on Aug. 14, 2025 in counterpart European Application No. 22875399.2.

* cited by examiner

FIG. 8
<< VIEWPOINT MOVEMENT IN RECEDING DIRECTION >>
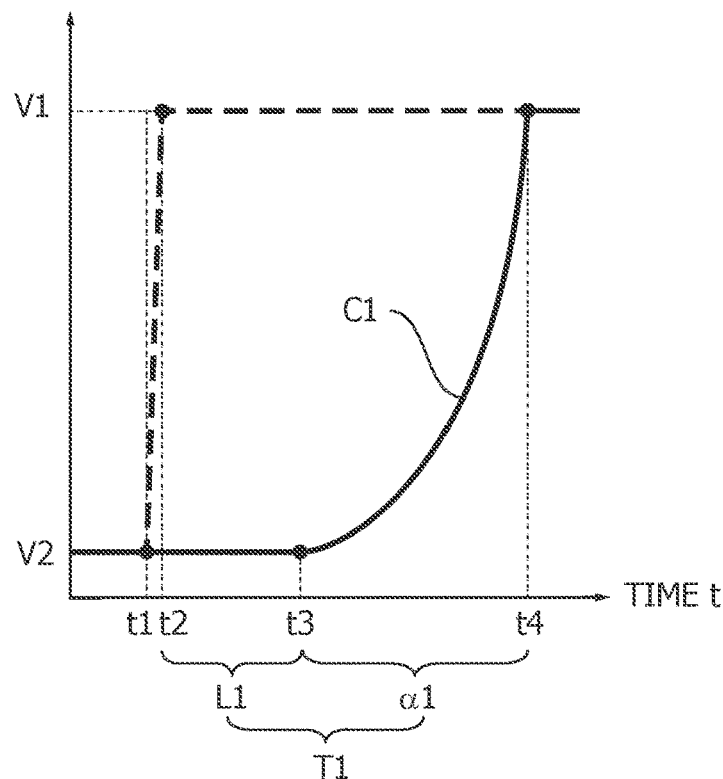
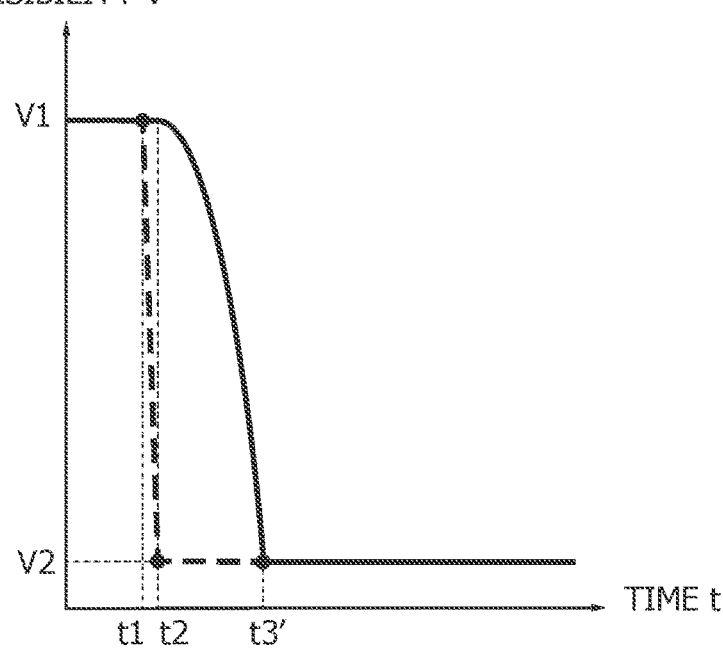

FIG. 10
<< VIEWPOINT MOVEMENT IN APPROACHING DIRECTION >>
MOVEMENT-DESTINATION VIEWPOINT PERIPHERAL REGION An
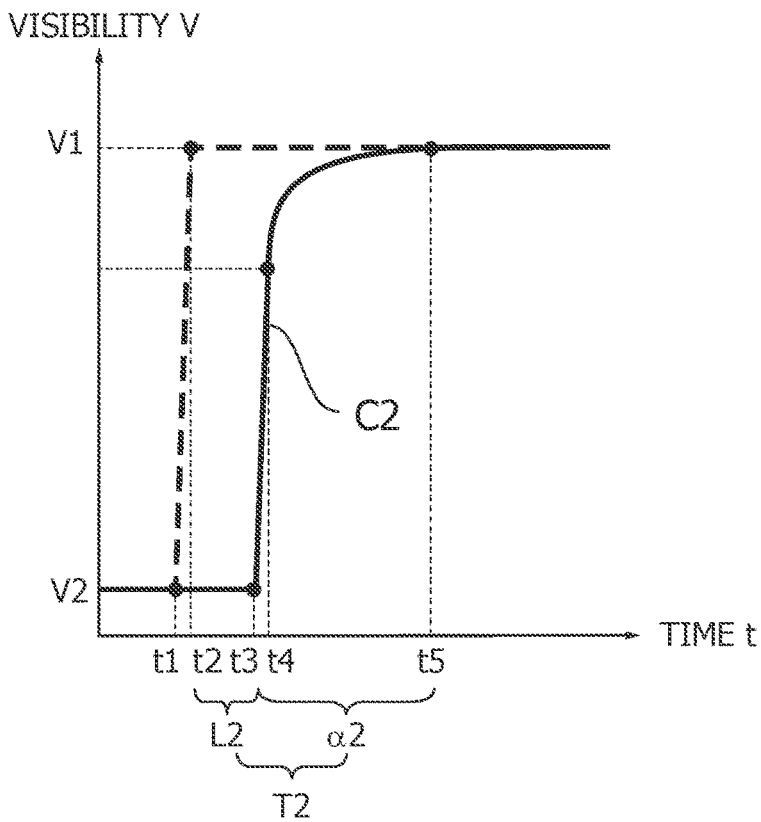
POINT-BEFORE-MOVEMENT VIEWPOINT PERIPHERAL REGION Af
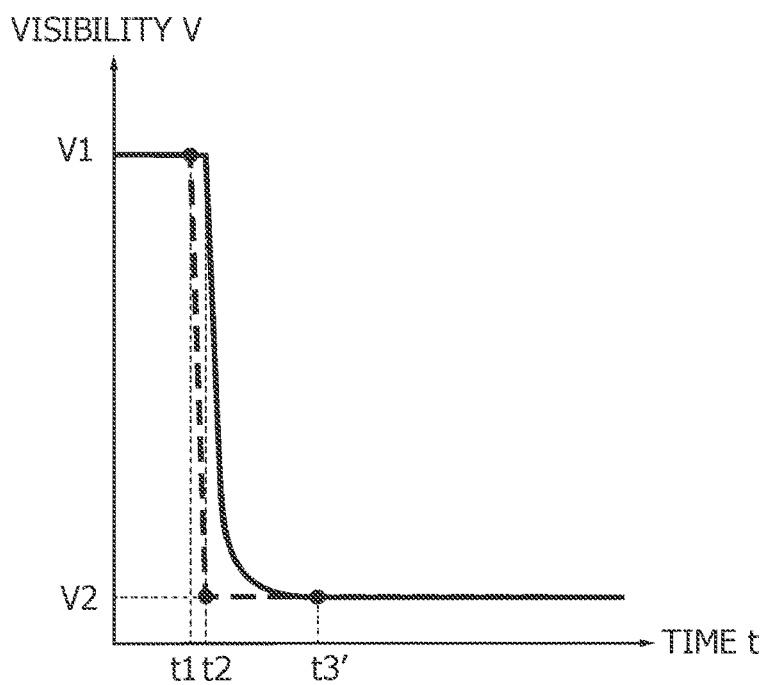

VIRTUAL SPACE IMAGE GENERATION DEVICE GENERATES A VIRTUAL SPACE BASED ON MOVEMENT OF A USER'S VIEWPOINT AND METHOD

CROSS-REFERENCE TO RELATED APPLICATIONS

This application is a U.S. National Phase of International Patent Application No. PCT/JP2022/012969, filed on Mar. 22, 2022, which published as WO 2023/053516 A1 on Apr. 6, 2023, and claims priority to JP 2021-161258, filed on Sep. 30, 2021, all of which are herein incorporated by reference in their entireties.

TECHNICAL FIELD

The present invention relates to a virtual space image generation device and to a method therefor.

BACKGROUND

As a prior art of generating a virtual space image and causing a display device to display the image, for example, in JP 2017-138701 A, a virtual space image providing method of providing a head mounted display (HMD) with a virtual space image for a user to view is disclosed. According to the virtual space image providing method, the rotation direction and the rotation speed of the HMD are acquired, and a blurring process is applied to end regions on both sides of a virtual space image in a direction on a screen that corresponds to the rotation direction, in a range and at a strength depending on the rotation speed, thereby alleviating Virtual Reality sickness (VR sickness).

SUMMARY

Incidentally, in vehicle development and the like, an object as an evaluation target is displayed on a virtual space image, and the visibility of the object in a real space is evaluated, in some cases. In such cases, the appearance of the object displayed on the virtual space image is required to be close to the appearance in real space. For example, immediately after the viewpoint of a user is changed or immediately after the arrangement or distance of the object in the field of view is changed, in real space, the viewpoint and the peripheral region of the object appear blurry. A blurriness of the peripheral region in response to such movement of the viewpoint or the like changes over time depending on the focal point adjustment characteristics of eyes, the state of the user, the state around the vehicle, etc. Accordingly, also in a case of displaying an object on a virtual space image and evaluating the visibility, it is desirable to reproduce the temporal change in blurriness in the real space as described above.

However, according to the prior art as described above, only the range and the strength of the blurring process applied to the virtual space image depending on the rotation speed of the HMD are set, without consideration of temporal change in the state of the blurring process applied to the set range. Typically, the blurring process for image data is executed at a speed in accordance with the performance of hardware that is responsible for image processing, and image data in a blurred state is generated at a desired strength and at a higher speed than the focal point adjustment speed of eyes. Consequently, according to the prior art, the temporal change in blurriness of the virtual space image displayed on the HMD when the HMD is rotated, i.e., when the orientation of the head of the user is changed and the viewpoint on the virtual space image is moved is different from that in the appearance of real space. There is thus room for improvement in evaluating the visibility of an object on the virtual space image.

An object of the present invention, which has been made in view of these points, is to provide a virtual space image generation device and method that can generate a virtual space image that achieves visibility close to that of the appearance of a real space when the viewpoint of the user moves.

To achieve the object, an aspect of the present invention provides a virtual space image generation device that generates a virtual space image including a visibility change region in which a visibility changes based on movement of a viewpoint of a user. The virtual space image generation device includes an image generation unit that generates the virtual space image in which a transition completion time period required for transition of a visibility of the visibility change region between a first state and a second state different from the first state changes based on a predetermined condition, when the viewpoint of the user moves.

According to the virtual space image generation device in an aspect of the present invention, the visibility of the visibility change region transitions between the first and second states over the transition completion time period, which changes based on the predetermined condition. Accordingly, a virtual space image that achieves visibility close to that of the appearance of a real space can be generated when the viewpoint of the user moves.

BRIEF DESCRIPTION OF THE DRAWINGS

FIG. 8 is graphs showing an example of temporal change in visibility in the case of movement in the direction in which the viewpoint recedes in the embodiment.

FIG. 10 is graphs showing an example of temporal change in visibility in a case in which the viewpoint moves in an approaching direction in the embodiment.

DESCRIPTION

Hereinafter, an embodiment of the present invention is described in detail with reference to the accompanying drawings.

Figure 1:
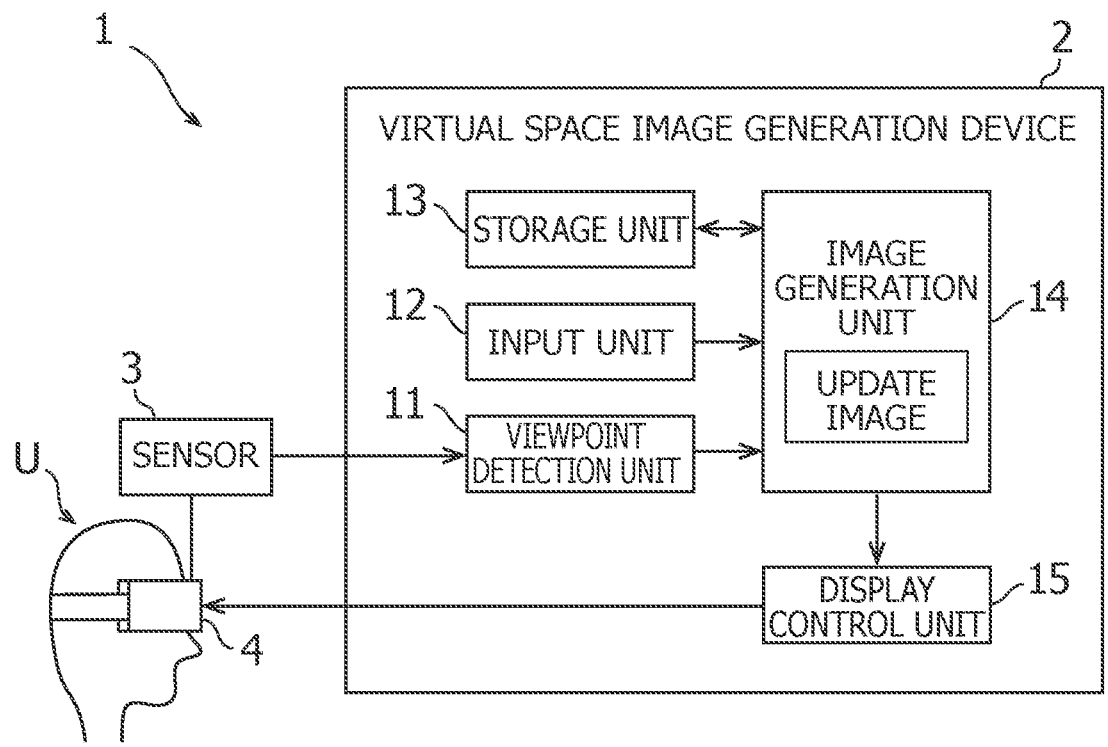
FIG. 1 is a block diagram showing a schematic configuration of a drive simulator system to which a virtual space image generation device according to one embodiment of the present invention is applied.

FIG. 1 is a block diagram showing a schematic configuration of a drive simulator system to which a virtual space image generation device according to one embodiment of the present invention is applied.

In FIG. 1, the drive simulator system 1 is used for, for example, visibility evaluation of various types of objects in development of vehicles, such as automobiles, a simulated experience of vehicle driving and the like. This drive simulator system 1 includes: a virtual space image generation device 2 according to this embodiment; a sensor 3; and an image formation device 4.

The virtual space image generation device 2 detects the motion of the user U, based on a signal output from the sensor 3, and generates a virtual space image including a region in which the visibility changes in accordance with the detected motion of the user U. The virtual space image generation device 2 then transmits the generated virtual space image to the user U via the image formation device 4, such as a head mounted display (HMD) worn on the head of the user U. The image formation device 4 in this embodiment includes left and right display units respectively corresponding to the left and right eyes of the user. The image formation device 4 displays virtual space images having parallax between the left and right display units, thereby allowing the user to perceive a three-dimensional virtual space. A method of displaying virtual space images having parallax respectively on the left and right display units may display different virtual space images respectively on the left and right display units, or output a common virtual space image on each of the left and right display units while providing optical shutters on the left and right display units and generating parallax between virtual space images output from the respective display units.

Note that the image formation device 4 is not limited to a configuration in which the display device for displaying virtual space images, such as an HMD, is worn on the head of the user U, and it may be an image display device, such as a liquid crystal display, disposed in front of the user U. The image formation device 4 may be an image projection device that projects a virtual space image on a predetermined projection surface (screen, glass, or wall surface), such as a projector or a head-up display. In this case, to perceive a virtual space from the projected virtual space image, it is preferable that optical shutter devices be separately worn on the left and right eyes of the user.

Such a drive simulator system 1 inputs virtual space images having different parallax respectively into the left and right eyes of the user U via the image formation device 4 (or optical shutter devices), thus allowing the user U to visually identify (perceive) the virtual space. Accordingly, various types of objects in the real space can be reproduced in the virtual space, and the visibilities of the various types of objects can be evaluated on the virtual space image, and vehicle driving can be experienced in the virtual space image in a simulated manner.

Specifically, the virtual space image generation device 2 includes, as its functional blocks, for example: a viewpoint detection unit 11; an input unit 12; a storage unit 13; an image generation unit 14; and a display control unit 15. Although not shown here, the hardware configuration of the virtual space image generation device 2 includes, for example, a computer system that includes a processor, a memory, a user input interface, and a communication interface. That is, in the virtual space image generation device 2, the processor of the computer system reads and executes the program stored in the memory, thereby achieving the functions of the viewpoint detection unit 11, the image generation unit 14, and the display control unit 15.

The viewpoint detection unit 11 detects the viewpoint of the user U using an output signal of the sensor 3. The viewpoint of the user U is a point on which the line of sight of the user U is placed in the image formation device 4. As the sensor 3, for example, a line-of-sight sensor or the like built in the HMD worn by the user U is used. The sensor 3 detects the motion of the eye of the user U and measures the direction of the line of sight, and outputs a signal indicating the direction of the line of sight to the viewpoint detection unit 11 via the communication interface of the computer system. The viewpoint detection unit 11 detects the position (coordinates on a two-dimensional plane) of the viewpoint of the user U in the image formation device 4, based on the line-of-sight direction of the user U measured by the sensor 3, on the positional relationship between the eye of the user U and the image formation device 4, and on positional information in the virtual space provided using image data of the virtual space stored in the storage unit 13. Such a function of detecting the viewpoint of the user U by the viewpoint detection unit 11 is sometimes called eye tracking. The viewpoint detection unit 11 transmits the positional information on the detected viewpoint to the image generation unit 14.

Note that the virtual space image generation device 2 may include a function of head tracking that detects the motion of the head of the user U, and a function of position tracking that detects the motion of the body of the user U, in addition to the function of eye tracking by the viewpoint detection unit 11. Detection results by these head tracking and position tracking are also transmitted, together with the detection result of the viewpoint detection unit 11, to the image generation unit 14. The detection results include, for example, information about the orientation of the head of the user U, and the direction of the line of sight of the user U may be estimated based on the information.

The input unit 12 is achieved by a user input interface of the computer system, and includes, for example, a keyboard, a mouse, and a controller for operation. The input unit 12 includes a reception unit that wiredly or wirelessly receives information from the outside, and also functions as an external information input interface that receives information from an external computer. The input unit 12 receives predetermined conditions, such as a condition pertaining to the environment of the virtual space (hereinafter called "environmental condition"), a condition pertaining to the user U (hereinafter called "user condition"), and a travel condition of the vehicle in the virtual space (travel path, and speed). The environmental condition includes the weather (fine, cloudy, rainy, foggy, etc.) in the virtual space, humidity, and the travel environment (outdoor, indoor, tunnel, etc.), the conditions of a windshield, or a combination thereof. The user condition includes the age, gender, eyesight, measure of the health of the eye, degree of opening of the eye, or dominant eye of the user U, or a combination thereof. The information about the predetermined condition input through the input unit 12 is transmitted to the image generation unit 14 and is stored in the storage unit 13.

Note that as the user condition, a value acquired by preliminarily performing an experiment on a subject assumed to be the user U of the drive simulator system 1 may be input into the virtual space image generation device 2 using the input unit 12. Alternatively, an image of the user U is taken using a camera or the like separately provided for the virtual space image generation device 2, and the user condition may be determined or detected based on the taken user image.

The storage unit 13 is achieved by a storage device (e.g., a magnetic disk, an optical disk, a flash memory, etc.) connected to the computer system, and stores various types of setting information, such as the aforementioned positional relationship between the eye of the user U and the image formation device 4, the environmental condition, the user condition, and the travel condition of the vehicle. The storage unit 13 stores image data of the virtual space including various types of objects. The various types of objects are various objects included in a scene viewable by the user U from the driver seat of the vehicle in the virtual space.

The image generation unit 14 generates virtual space images to be displayed on the image formation device 4, using the image data stored in the storage unit 13, and the image data and the various types of setting information received from the input unit 12. At this time, the image generation unit 14 generates virtual space images in which the visibility in a predefined visibility change region is in a first state, and the visibility outside of the visibility change region is in a second state different from the first state, based on viewpoint detected by the viewpoint detection unit 11. That is, each virtual space image generated by the image generation unit 14 includes an image portion having a relatively high visibility, and an image portion having a relatively low visibility. The image generation unit 14 then updates the virtual space image so as to allow transition between the first state in which the image portion positioned in the visibility change region has a relatively high visibility than the image portion positioned outside of the visibility change region does, and the second state in which the image portion positioned in the visibility change region has a relatively low visibility than the image portion positioned outside of the viewpoint peripheral region does. Note that the visibility change region includes not only a point-before-movement viewpoint peripheral region and a movement-destination viewpoint peripheral region, which are described later, but also a region other than the viewpoint peripheral regions.

The state of the visibility is controlled by, for example, applying a blurring process to an image to be displayed in a region serving as a target. The blurring process is a process of changing the amount of information on the image data, and achieving a state in which the image appears blurry. In other words, the blurring process is image processing for reducing the amount of information that the user U can identify by sight. A specific example of the blurring process may be a process of reducing the amount of information, a process of reducing the resolution, or a process of gradually reducing the display area, a process of gradually increasing the display area, or a combination of these processes or the like with respect to the image (object) to be displayed in the region serving as the target to be processed. According to an example of combination of the processes, an out-of-focus state can be easily reproduced by sequentially or alternatingly performing the process of gradually increasing the display area, and the process of gradually reducing the display area. Consequently, the first state having a relatively high visibility is, for example, an in-focus state before application of the blurring process, and represents a state in which the amount of information that can be identified about the image by sight by the user U is large. The second state having a relatively low visibility is, for example, an out-of-focus blurred state after application of the blurring process, and represents a state in which the amount of information that can be identified about the image by sight by the user U is small.

Figure 2:
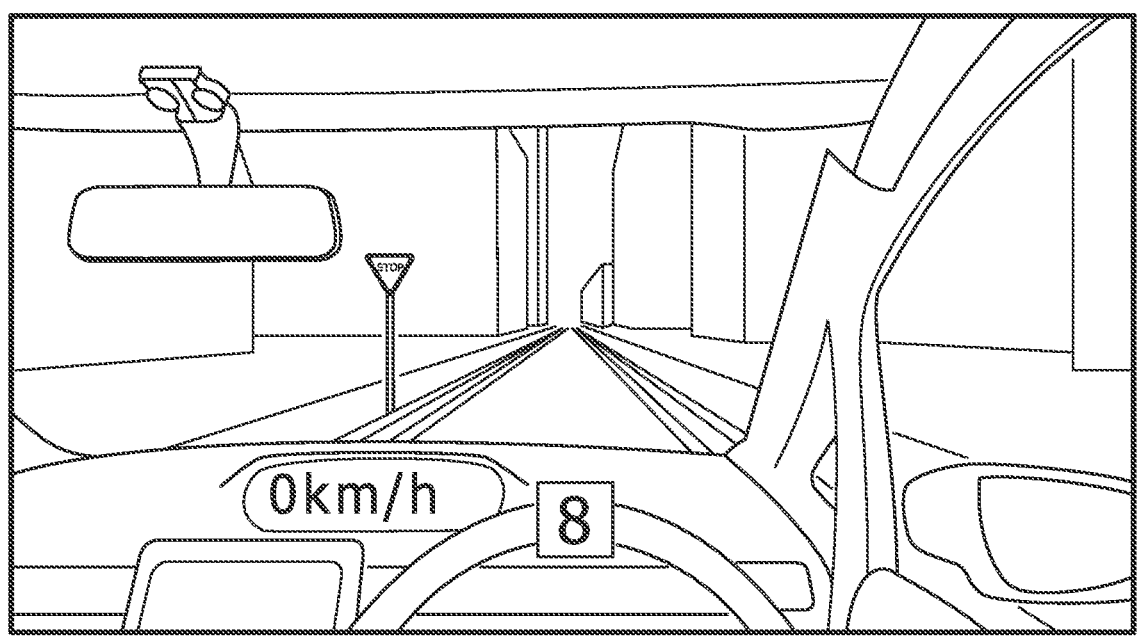
FIG. 2 is a diagram showing an example of a virtual space image to which a blurring process has not been applied yet in the embodiment.
Figure 3:
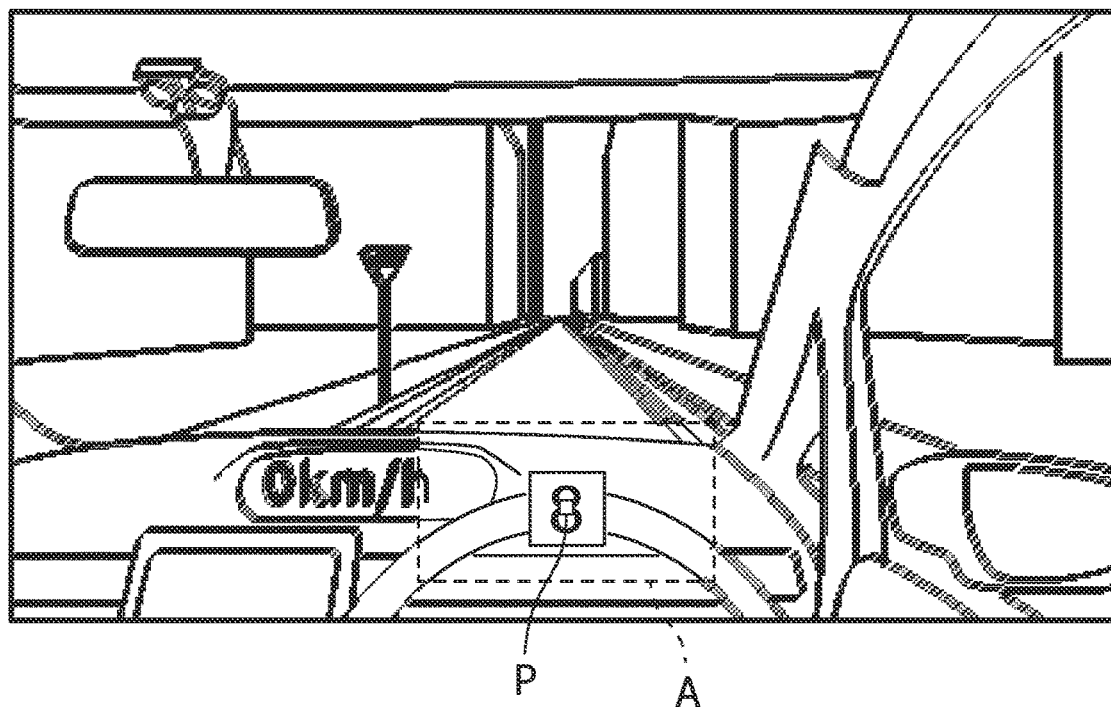
FIG. 3 is a diagram showing an example of a virtual space image in which the blurring process has been applied to the outside of a viewpoint peripheral region in the embodiment.

FIG. 2 shows an example of the virtual space image to which the blurring process has not been applied yet. The virtual space image is a virtual space image to be input into one of the left and right eyes. Another virtual space image (not shown) having different parallax from the virtual space image in FIG. 2 is input into the other of the left and right eyes. The user U can perceive the virtual space by the virtual space images that have different parallax and are to be respectively input into the left and right eyes. FIG. 3 shows an example of a virtual space image in which the blurring process has been applied to the outside of the viewpoint peripheral region.

As shown in FIGS. 2 and 3, in the virtual space image generated by the image generation unit 14, a scene in the virtual space viewable by the user U from the driver seat of the vehicle is represented. In the example shown, the virtual space image may include an upper part of a steering wheel, an upper part of a dashboard, a right front pillar, a front end of a roof, a rearview mirror, and a right side mirror, as objects representing the vehicle. A numeral "8" displayed at the center of a lower part of the virtual space image is an object for evaluating the visibility around the upper end of the steering wheel. The virtual space image includes a road, a sidewalk, a building, and a traffic sign (stop), as objects representing stationary objects outside of the vehicle.

In the virtual space image to which the blurring process has not yet been applied (FIG. 2), all the objects are in focus, and the visibility of the entire region of the virtual space image is in a state with high visibility. On the other hand, in the virtual space image to which the blurring process has been applied (FIG. 3), the viewpoint (symbol □) of the user U is at a position P on the object of numeral "8" displayed around the upper end of the steering wheel, objects positioned in a viewpoint peripheral region A surrounded by broken lines in the diagram are in focus, and objects positioned outside of the viewpoint peripheral region A are out of focus and in a blurred state. That is, in the virtual space image which has been generated by the image generation unit 14 and to which the blurring process has been applied in accordance with the position P of the viewpoint of the user U, the visibility in the viewpoint peripheral region A is in the relatively high first state, and the visibility outside of the viewpoint peripheral region A is in the relatively low second state. Note that the symbol indicating the viewpoint of the user U is not displayed in the actual virtual space image.

The image generation unit 14 updates the virtual space image to which the blurring process has been applied, when the viewpoint of the user U moves. The virtual space image updating process can be executed for any movement of the viewpoint of the user U. For example, in FIG. 3, when the position P of the viewpoint of the user U moves to a different position in the viewpoint peripheral region A, an image of a portion at which the viewpoint peripheral region deviates before and after movement is updated. For example, when the position P of the viewpoint of the user U moves to a separate position out of the viewpoint peripheral region A, and the movement-destination viewpoint peripheral region is positioned outside of the point-before-movement viewpoint peripheral region, the image of the entire movement-destination viewpoint peripheral region, and the image of the entire point-before-movement viewpoint peripheral region are updated. In the case in which the amount of viewpoint movement is small as in the former case, the amount of data of the image to be updated is small. Accordingly, the load of the image processing in the image generation unit 14 is reduced. Hereinafter, image processing as in the latter case in which the amount of viewpoint movement is large is described in detail with specific examples.

Figure 4:
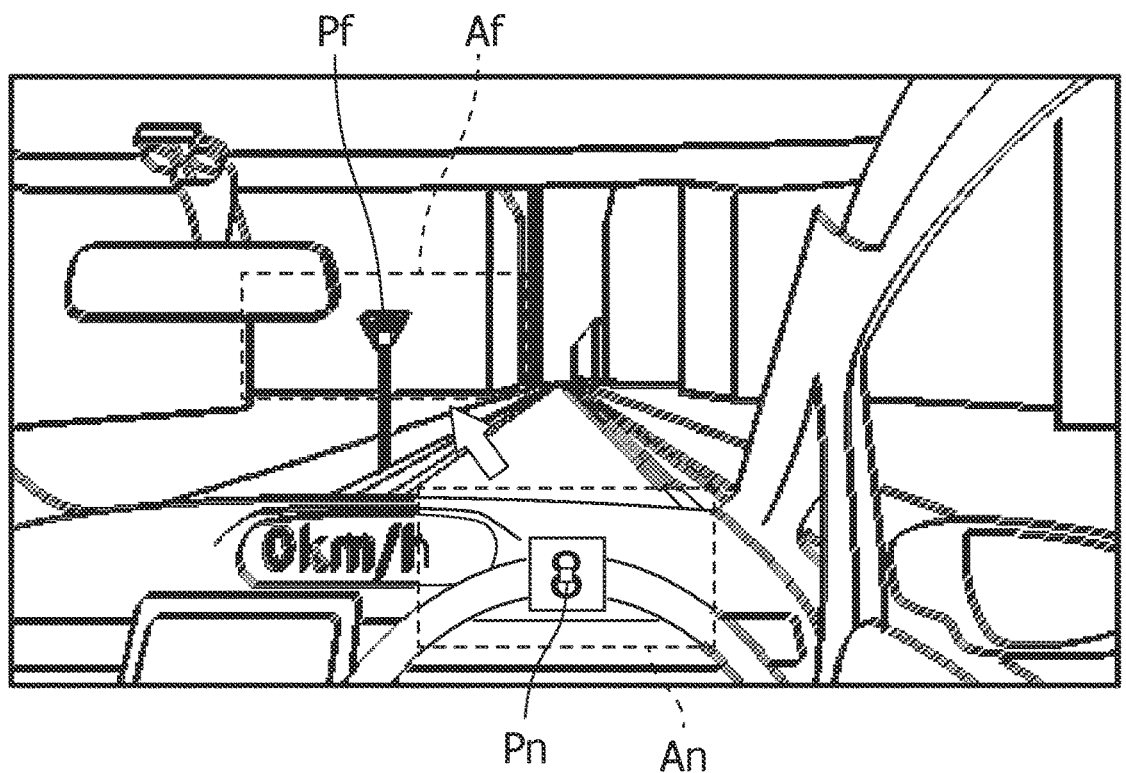
FIG. 4 is a diagram showing an example of movement of the viewpoint of the user on the virtual space image in FIG. 3.

FIG. 4 shows an example of movement of the viewpoint of the user U. In the example in FIG. 4, the viewpoint of the user U (symbol □) moves from a position Pn on an object (first object) of numeral "8" displayed around the upper end of the steering wheel, to a position Pf on an object (second object) of a traffic sign installed on a sidewalk on the left side in front of the vehicle. The object of the traffic sign is positioned away from the object around the upper end of the steering wheel in the depth direction in the virtual space. Consequently, in the virtual space, the viewpoint of the user U moves in the upper left direction on a two-dimensional plane (on the virtual space image) extending in the lateral direction and vertical direction, and moves away in the depth direction.

Note that the depth direction in the virtual space varies depending on the implementation of the image formation device 4. Specifically, in a case of the image formation device 4 with the head position of the user U being unchanged, the depth direction is a specific direction (for example, the front-back direction) preset in the virtual space. On the other hand, in a case of the image formation device 4 with the head position of the user U changing by head tracking or the like, the depth direction is a predetermined direction that relatively varies depending on the position of the head. For example, the direction may be a direction in which the head faces, or the line-of-sight direction of the user U with respect to the viewpoint of the user U before movement, i.e., a direction connecting an eye E of the user U and an actual viewpoint before movement or a viewpoint before movement in the virtual space.

Figure 5:
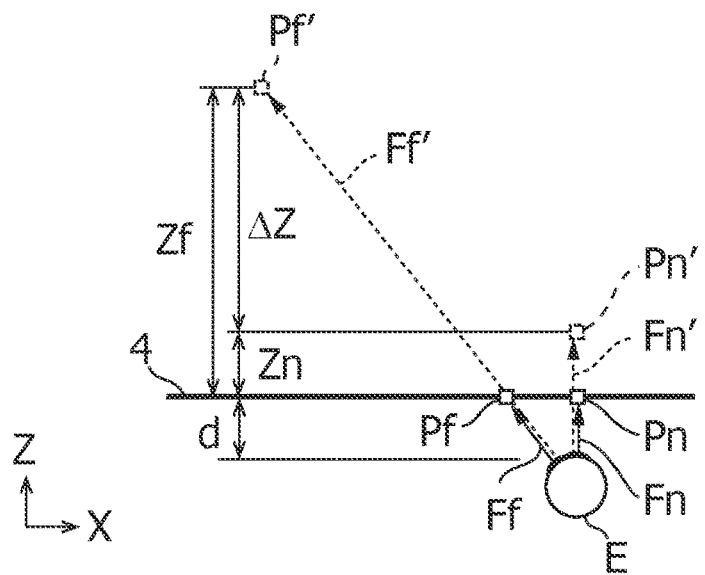
FIG. 5 is a conceptual diagram of the viewpoint movement in the virtual space in FIG. 4 viewed from above.

FIG. 5 is a conceptual diagram of the movement of the viewpoint of the user U in the virtual space as described above viewed from above. In FIG. 5, the arrow Z direction indicates the depth direction (vehicle front-back direction) of the virtual space, and the arrow X direction indicates the horizontal direction (vehicle width direction) in the virtual space. As shown in FIG. 5, the viewpoint of the user U moves from the position Pn to the position Pf on the image formation device 4 (on the virtual space image). The first object (numeral "8") displayed at the position Pn of the point-before-movement viewpoint is at a position Pn' separated by a distance Zn in the depth direction from the image formation device 4 in the virtual space. The second object (traffic sign) displayed at the position Pf of the movement-destination viewpoint is at a position Pf apart by a distance Zf in the depth direction from the image formation device 4 in the virtual space. The distance Zf is longer by a distance ΔZ than the distance Zn.

The focal point (focus) of the eye E of the user U in the real space is at the position Pn on the image formation device 4 at the viewpoint before movement, and is at the position Pf on the image formation device 4 at the viewpoint movement destination. That is, as indicated by a solid-line arrow in FIG. 5, the realistic focal length of the eye E of the user U is a distance Fn from the eye E to the position Pn at the viewpoint before movement, and a distance Ff from the eye E to the position Pf at the viewpoint movement destination. The letter d denotes the distance between the eye E of the user U and the image formation device 4 in the depth direction. In FIG. 5, the line of sight is changed by the sight line movement by the user U. Accordingly, even though the distances Fn and Ff at the positions Pn and Pf are different from each other, the amount of change Δd (not shown) in distance before and after movement is small.

On the other hand, as indicated by a broken-line arrow in FIG. 5, the virtual focal length of the eye E of the user U is a distance Fn' from the eye E to the position Pn' at the viewpoint before movement, and a distance Ff from the eye E to the position Pf at the viewpoint movement destination. That is, in the virtual space, the position Pn' is disposed backward by the distance Zn in the depth direction from the position Pn, and the position Pf is disposed backward by the distance Zf in the depth direction from the position Pf. The position Pf is disposed backward only by the distance ΔZ in the depth direction from the position Pn'. Furthermore, in FIG. 5, the distance ΔZ is much larger than the distance Δd. In this embodiment, a process of generating (updating) the virtual space image displayed on the image formation device 4 is performed so that the change in realistic focal lengths Fn and Ff associated with the movement of the viewpoint of the user U, and the difference in appearance due to the difference between changes in virtual focal lengths Fn' and Ff can be suppressed.

When movement of the viewpoint of the user U as described above occurs, the image generation unit 14 determines the movement direction and the amount of movement of the viewpoint on the image formation device 4 (on the virtual space image), based on the change in positions Pn and Pf (coordinates on the two-dimensional plane) of the viewpoint detected by the viewpoint detection unit 11. The image generation unit 14 determines the viewpoint positions Pn' and Pf in the virtual space, based on the depth information corresponding to the positions Pn and Pf of the viewpoint detected by the viewpoint detection unit 11 in the depth information defined for each pixel (or for each object) on the virtual space image, and determines whether or not the viewpoint in the virtual space moves at least in the depth direction, that is, whether the viewpoint moves in the receding direction or the approaching direction in the virtual space. When the viewpoint moves in the depth direction in the virtual space, the image generation unit 14 executes a virtual space image updating process.

In this updating process, the image generation unit 14 performs a first process of updating the virtual space image so that the visibility in the movement-destination viewpoint peripheral region Af (visibility change region) can increase from the second state to the first state, and the transition completion time period required for transition of the visibility between the first state and the second state can change based on the predetermined condition, and a second process of updating the virtual space image so that the visibility in the point-before-movement viewpoint peripheral region An can decrease from the first state to the second state. The transition completion time period is a time period from completion of the movement of the viewpoint of the user U to completion of transition of the visibility. That is, in the virtual space image updating process by the image generation unit 14, the virtual space image is generated such that the visibility in the movement-destination viewpoint peripheral region Af transitions from the second state to the first state over the transition completion time period, which changes based on the predetermined condition, and the visibility in the point-before-movement viewpoint peripheral region An transitions from the first state to the second state.

As shown in FIG. 4, in the virtual space image immediately after movement of the viewpoint of the user U, the visibility in the point-before-movement viewpoint peripheral region An is in the first state (in-focus state), and the visibility in the movement-destination viewpoint peripheral region Af is in the second state (out-of-focus blurred state). The visibility state (state of the blurring process) in such a virtual space image immediately after movement of the viewpoint of the user U is the same as the visibility state in the virtual space image shown in FIG. 3 (before movement of the viewpoint of the user U) described above.

Figure 6:
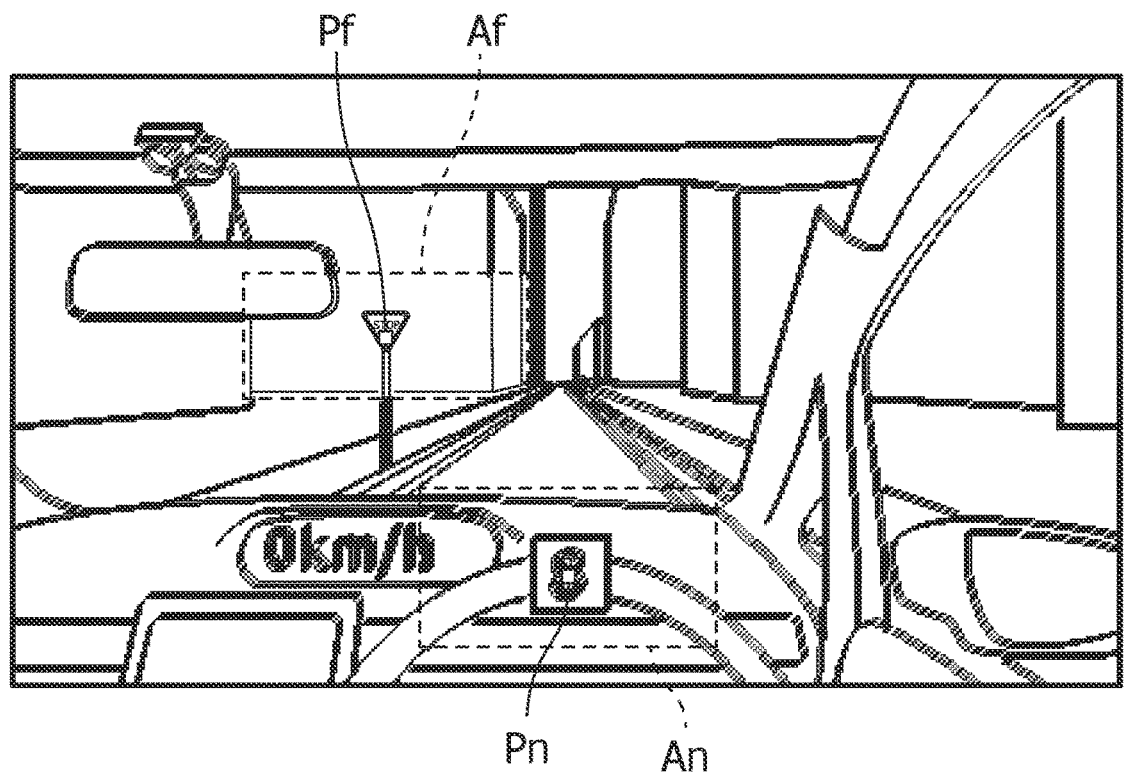
FIG. 6 is a diagram showing an example of a virtual space image after a required time period elapses subsequent to movement of the viewpoint of the user in the embodiment.

FIG. 6 shows an example of the virtual space image after the transition completion time period elapses subsequent to the movement of the viewpoint of the user U. As shown in FIG. 6, in the virtual space image immediately after the transition completion time period elapses and the updating process (the first process and the second process) is completed, the visibility in the point-before-movement viewpoint peripheral region An transitions to the second state (out-of-focus blurred state), and the visibility in the movement-destination viewpoint peripheral region Af transitions to the first state (in-focus state).

Note that when the detection result by the head tracking or position tracking described above is transmitted, the image generation unit 14 may change the virtual space image in response to the motion of the head or the motion of the body of the user U. For example, when the user U turns the head to the left, the image generation unit 14 changes the virtual space image so that a scene in the left direction of the user U can be rendered in the virtual space in synchronization with the motion of the head of the user U detected by head tracking. For example, when the user U moves and the position of the body is changed, the image generation unit 14 changes the virtual space image so that the field of view of the user U can transition in response to the current position of the user U detected by position tracking.

The display control unit 15 (FIG. 1) generates a control signal for causing the image formation device 4 to display the virtual space image generated by the image generation unit 14, and outputs the control signal to the image formation device 4. The image formation device 4 having received the control signal from the display control unit 15 displays the virtual space image according to the control signal.

Next, the operation of the virtual space image generation device 2 according to this embodiment is described.

Figure 7:
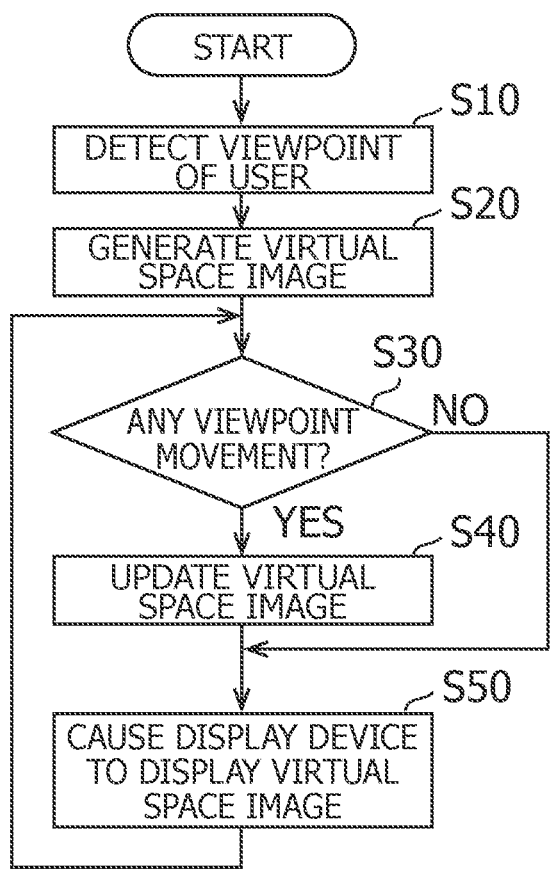
FIG. 7 is a flowchart showing an example of a virtual space image generation method in the embodiment.

FIG. 7 is a flowchart showing an example of the virtual space image generation method by the virtual space image generation device 2.

According to the generation device 2 in this embodiment, first, in step S10 of FIG. 7, the viewpoint detection unit 11 detects the position (coordinates on the two-dimensional plane) of the viewpoint of the user U on the image formation device 4, using the output signal of the sensor 3. The viewpoint position detecting process by the viewpoint detection unit 11 is repeatedly executed at a predetermined period. Position information on the viewpoint of the user U detected by the viewpoint detection unit 11 is transmitted to the image generation unit 14.

In subsequent step S20, the image generation unit 14 having received the viewpoint position information from the viewpoint detection unit 11 generates the virtual space image to be displayed on the image formation device 4, using image data stored in the storage unit 13 (or image data received from the input unit 12), and various types of setting information. At this time, the image generation unit 14 applies the blurring process to an image portion positioned outside of the viewpoint peripheral region A, based on the position P of the viewpoint of the user U, as in the example shown in FIG. 3 described above. Accordingly, the virtual space image is generated such that the visibility in the viewpoint peripheral region A is in the relatively high first state, and the visibility outside of the viewpoint peripheral region A is in the relatively low second state.

In next step S30, the image generation unit 14 executes a process of determining movement of the viewpoint of the user U, based on the viewpoint position information transmitted from the viewpoint detection unit 11 with the predetermined period. In the determining process, it is determined whether or not the movement-destination viewpoint is moved at least in the depth direction with respect to the viewpoint before movement. If the viewpoint movement is present (YES), the processing proceeds to next step S40. If the viewpoint movement is not present (NO), the processing transitions to step S50.

In step S40, the image generation unit 14 performs the virtual space image updating process in response to movement of the viewpoint of the user. After the updating process is completed, the processing proceeds next step S50, in which the display control unit 15 performs control of causing the image formation device 4 to display the virtual space image generated (or updated) by the image generation unit 14. After the virtual space image is displayed by the image formation device 4, the processing returns to step S30, and similar processes are repetitively executed.

Here, the virtual space image updating process in the step S40 is specifically described.

As described above, when the viewpoint of the user U moves, the image generation unit 14 according to this embodiment performs the first process of updating the virtual space image so that the visibility in the movement-destination viewpoint peripheral region Af can increase from the second state to the first state, and the transition completion time period required for transition of the visibility between the first state and the second state can change based on the predetermined condition, and the second process of updating the virtual space image so that the visibility in the point-before-movement viewpoint peripheral region An can decrease from the first state to the second state.

In such a virtual space image updating process, the transition of the visibility in the movement-destination viewpoint peripheral region from the second state to the first state is achieved by reducing the blurring process to be applied to the image in the movement-destination viewpoint peripheral region. That is, by reducing the blurring amount (blurring rate) of the image subjected to the blurring process, and causing the state to be close to an in-focus state, the visibility in the region is increased, and the second state is caused to transition to the first state. The process of reducing the blurring amount for transition of the visibility from the second state to the first state is performed over the transition completion time period. The transition completion time period includes a delay time period from completion of the movement of the viewpoint of the user U to start of the process of reducing the blurring amount, and a transition time period from start to completion of the process of reducing the blurring amount.

The transition of the visibility in the point-before-movement viewpoint peripheral region from the first state to the second state is achieved by applying the blurring process to the image in the point-before-movement viewpoint peripheral region. That is, by increasing the blurring amount (blurring rate) of the image subjected to the blurring process, the visibility in the region is reduced, and the first state is caused to transition to the second state.

In the first process for the virtual space image by the image generation unit 14, the delay time period and the transition time period included in the transition completion time period change in accordance with the movement direction of the viewpoint of the user U, which is one of the predetermined conditions. The movement direction of the viewpoint of the user U includes vertical and lateral directions on the image formation device 4 (on the virtual space image), the depth direction in the virtual space, and a combination of these directions. In this embodiment, for example, the delay time period and the transition time period change depending on whether the viewpoint of the user U moves in the receding direction or in the approaching direction with respect to the depth direction in the virtual space. The movement of the viewpoint of the user U from the position Pn to the position Pf exemplified in FIGS. 4 to 6 described above corresponds to viewpoint movement in the receding direction. The reverse movement (movement from the position Pf to the position Pn) corresponds to viewpoint movement in the approaching direction. Hereinafter, the manner of change in the delay time period and the transition time period, which are included in the transition completion time period, is described in detail using specific examples for the directions of viewpoint movement.

FIG. 8 is graphs showing an example of temporal change in visibility in the case of movement of the viewpoint in the receding direction. The graph in the upper part of FIG. 8 corresponds to the movement-destination viewpoint peripheral region Af. The graph in the lower part of FIG. 8 corresponds to the point-before-movement viewpoint peripheral region An. The ordinate axis of each graph indicates the state of the visibility V, and the abscissa axis indicates the time t. The state of the visibility V on the ordinate axis increases the farther from the intersection (origin) with the abscissa axis. Note that the state of the visibility V corresponds to the blurring amount (blurring rate) of the image in the blurring process as described above. Accordingly, the ordinate axis of each graph of FIG. 8 also represents the blurring amount of the image. The blurring amount reduces as the position is farther from the origin.

In FIG. 8, the viewpoint of the user U is at the position Pn (on the first object with the numeral "8") at time t1, and moves to the position Pf (on the second object of the traffic sign) at time t2. At time t1, the visibility in the movement-destination viewpoint peripheral region Af is in the relatively low second state V2, and the visibility in the point-before-movement viewpoint peripheral region An is in the relatively high first state V1.

Broken lines in each graph in FIG. 8 represent temporal change in visibility corresponding to the blurring process applied to the virtual space image in the prior art as described above. In the prior art, the blurring process applied to the virtual space image is executed at a speed in accordance with the performance of hardware that is responsible for image processing. Thus, transition of the visibility (blurring amount) between the first state V1 and the second state V2 is completed in a short period (time t1 to t2) at substantially same time as movement of the viewpoint of the user U.

On the other hand, in the virtual space image updating process by the image generation unit 14 in this embodiment, as shown in solid lines in the graphs, the visibility in the movement-destination viewpoint peripheral region Af gradually increases from the second state V2 and transitions to the first state V1, and the visibility in the point-before-movement viewpoint peripheral region An immediately decreases from the first state V1 and transitions to the second state V2.

Specifically, as shown in the graph in the upper part of FIG. 8, as to the temporal change in visibility in the movement-destination viewpoint peripheral region Af, the visibility is maintained in the second state V2 in a period (time t2 to t3) from completion of movement of the viewpoint of the user U until elapse of a predetermined delay time period L1, and the visibility starts to increase at time t3. After time t3, the visibility in the movement-destination viewpoint peripheral region Af gradually changes with the elapse of time, and increases to the first state V1 at time t4.

That is, subsequent to the elapse of the delay time period L1 after completion of the movement of the viewpoint of the user U, a process of reducing the blurring process applied to the image in the movement-destination viewpoint peripheral region Af is started. By gradually reducing the blurring amount (blurring rate) of the image over time, the visibility in the movement-destination viewpoint peripheral region Af transitions from the second state V2 (out-of-focus blurred state) to the first state V1 (in-focus state). A transition time period α1 from start to completion of transition is time t3 to t4. A transition completion time period T1 (time t2 to t4) from completion of movement of the viewpoint of the user U to completion of visibility transition is the sum of the delay time period L1 and the transition time period α1.

Here, the state in which the image in the movement-destination viewpoint peripheral region Af is in focus corresponds to the state in which the focus of the eye E of the user U is on the virtual position Pf of the movement-destination viewpoint, as described above with reference to FIG. 5. That is, the image processing of increasing the visibility in the movement-destination viewpoint peripheral region Af on the virtual space image to the first state corresponds to the operation in the real space by the user U employing the focal point adjustment function of the eye E to adjust the focal length to Ff. Consequently, if the temporal change in visibility during increase of the visibility to the first state V1 is close to the temporal change in focal length during setting of the focal length to Ff by the focal point adjustment function of the eye E, the virtual space image that achieves visibility close to that of the appearance of a real space can be generated.

In the graph in the upper part of FIG. 8, the curve C1 over the transition time period α1 represents the temporal change in visibility during increase of the visibility in the movement-destination viewpoint peripheral region Af to the first state V1. The shape of the curve C1 is made to follow, for example, the function indicated in the following Expression (1), thereby allowing approximation of the shape to the temporal change in focal length by the focal point adjustment function of the eye E.

[Expression 1]

$$F = \{Do - (Do - Dt) * (1 - e^{-t/\tau})\}^{-1} \quad (1)$$

In the Expression (1), t represents the time [s] after start of the process of reducing the blurring process. F represents the focal length [m] at time t. Do represents the diopter that is the reciprocal of the focal length at the start of movement of viewpoint. Dt represents the diopter that is the reciprocal of the focal length at the end of movement of viewpoint. The e represents Napier's constant (base of natural logarithms).

The τ represents the time constant. When the viewpoint moves in the receding direction as in FIG. 8, Do denotes 1/Fn', and Dt denotes 1/Ff.

The focal length F in the Expression (1) corresponds to the state of the visibility V at time t. Specifically, the first state V1 of the visibility corresponds to the state in which the focal length F of Expression (1) is the virtual focal length Ff shown in FIG. 5 described above (F=Ff). The second state V2 of the visibility corresponds to the state in which the focal length F of Expression (1) is the virtual focal length Fn' shown in FIG. 5 (F=Fn').

Figure 9:
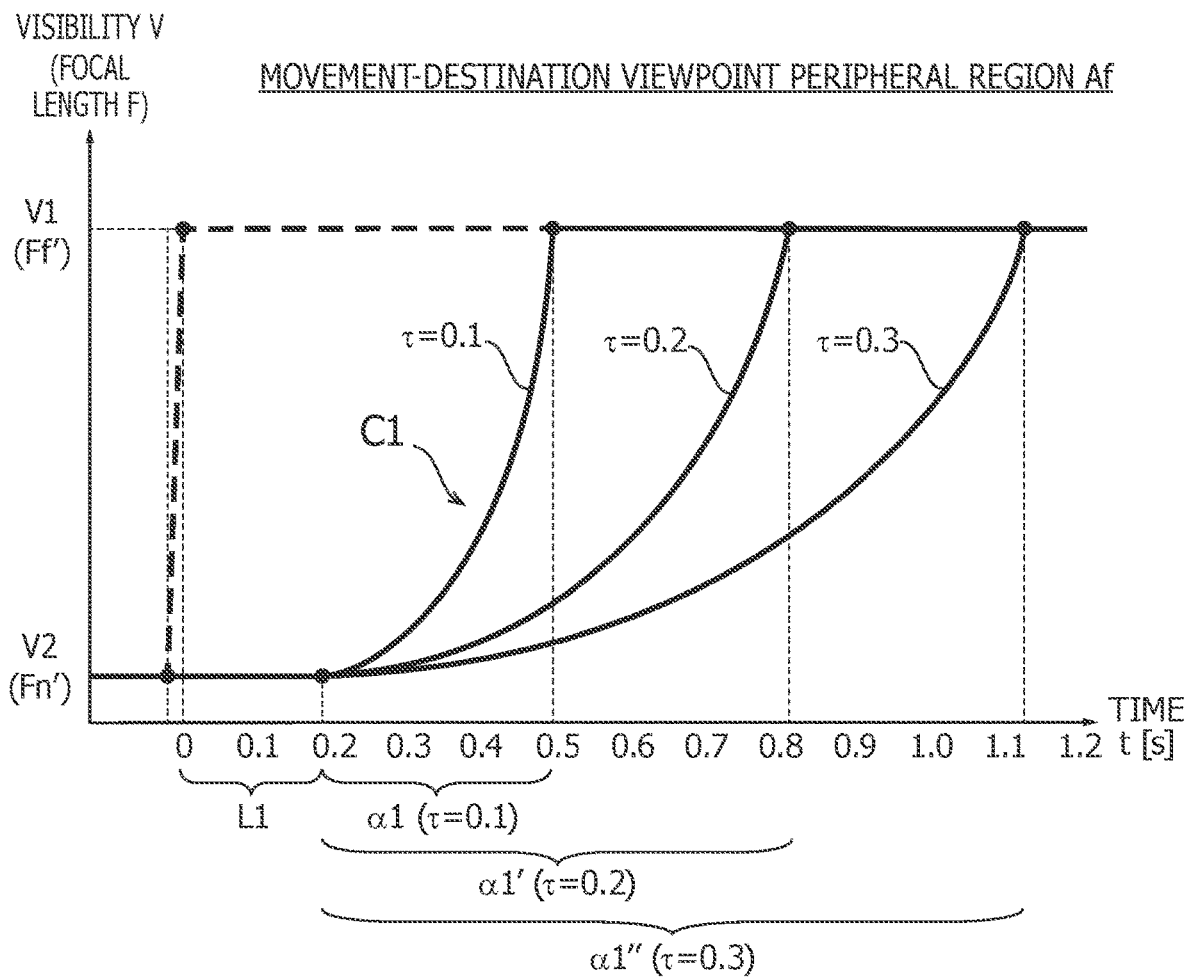
FIG. 9 is a graph exemplifying change in a case in which a value of a time constant of a function representing the shape of a curve in a graph of FIG. 8 is changed.

The time constant τ in the Expression (1) is set in conformity with the environmental conditions and the user conditions described above. The length of the transition time period α1 (shape of the curve C1) changes depending on the time constant t. FIG. 9 exemplifies the change in transition time period α1 in a case in which the value of the time constant τ is changed. In the example in FIG. 9, the transition time period α1' in the case of τ=0.2 is longer than the transition time period α1 in the case in which the value of the time constant τ is τ=0.1, and furthermore, the transition time period α1" in the case of τ=0.3 is longer than the transition time period α1'.

With respect to the temporal change in visibility in the movement-destination viewpoint peripheral region Af described above, the temporal change in visibility in the point-before-movement viewpoint peripheral region An, visibility starts to decrease from the first state V1 immediately after completion of the movement of the viewpoint of the user U and decreases to the second state V2 at time t3' as shown in the graph in the lower part of FIG. 8. That is, the blurring process for the image in the point-before-movement viewpoint peripheral region An is started immediately after completion of the movement of the viewpoint of the user U. By increasing the blurring amount (blurring rate) of the image over time, the visibility in the point-before-movement viewpoint peripheral region An transitions from the first state V1 (in-focus state) to the second state V2 (out-of-focus blurred state). By changing the visibility in the point-before-movement viewpoint peripheral region An as described above, the user U can be prevented from feeling the appearance of the point-before-movement viewpoint peripheral region An strange.

FIG. 10 is graphs showing an example of temporal change in visibility in the case of movement of the viewpoint in the approaching direction. The graph in the upper part of FIG. 10 corresponds to the movement-destination viewpoint peripheral region An. The graph in the lower part of FIG. 10 corresponds to the point-before-movement viewpoint peripheral region Af. Similar to FIG. 8 described above, the ordinate axis of each graph represents the state of the visibility V (blurring amount), and the abscissa axis represents time t. The state of the visibility V on the ordinate axis increases as the position is farther from the intersection (origin) with the abscissa axis (the blurring amount decreases as the position is farther from the origin).

In FIG. 10, the viewpoint of the user U is at the position Pf (on the second object of the traffic sign) at time t1, and moves to the position Pn (on the first object with the numeral "8") at time t2. At time t1, the visibility in the movement-destination viewpoint peripheral region An is in the relatively low second state V2, and the visibility in the point-before-movement viewpoint peripheral region Af is in the relatively high first state V1.

Similarly to the case in FIG. 8 described above, broken lines in the graphs in FIG. 10 represent the temporal change in visibility corresponding to the blurring process applied to the virtual space image in the prior art, and transition of the visibility from the first state V1 to the second state V2 is completed in a short period (time t1 to t2).

On the other hand, in the virtual space image updating process by the image generation unit 14 in this embodiment, as shown in solid lines in the graphs, the visibility in the movement-destination viewpoint peripheral region An gradually increases from the second state V2 and transitions to the first state V1, and the visibility in the point-before-movement viewpoint peripheral region Af immediately decreases from the first state V1 and transitions to the second state V2.

Specifically, as shown in the graph in the upper part of FIG. 10, as to the temporal change in visibility in the movement-destination viewpoint peripheral region An, the visibility is maintained in the second state V2 in a period (time t2 to t3) from completion of movement of the viewpoint of the user U until elapse of a predetermined delay time period L2, and the visibility starts to increase at time t3. The delay time period L1 in the viewpoint movement in the receding direction described above is set to be longer than the delay time period L2 in the viewpoint movement in the approaching direction (L1>L2). Preferably, the delay time period L1 in the viewpoint movement in the receding direction is twice as long or more as the delay time period L2 in the viewpoint movement in the approaching direction. Specifically, it has been confirmed by experiments that it is preferable that the delay time period L1 in the viewpoint movement in the receding direction should be set in a range from 0.05 to 0.2 seconds (0.05<L1<0.2), and the delay time period L2 in the viewpoint movement in the approaching direction should be set in a range from 0 to 0.05 seconds (0<L2<0.05). After time t3, the visibility in the movement-destination viewpoint peripheral region Af gradually changes with the elapse of time, and increases to the first state V1 at time t5.

That is, subsequent to the elapse of the delay time period L2 after completion of the movement of the viewpoint of the user U, a process of reducing the blurring process applied to the image in the movement-destination viewpoint peripheral region An is started. By gradually reducing the blurring amount (blurring rate) of the image over time, the visibility in the movement-destination viewpoint peripheral region An transitions from the second state V2 (out-of-focus blurred state) to the first state V1 (in-focus state). A transition time period α2 from start to completion of transition is time t3 to t5. The transition time period α1 in the viewpoint movement in the receding direction described above is set to be longer than the transition time period α2 in the viewpoint movement in the approaching direction (α1>α2). A transition completion time period T2 (time t2 to t5) from completion of movement of the viewpoint of the user U to completion of visibility transition is the sum of the delay time period L2 and the transition time period α2.

Figure 11:
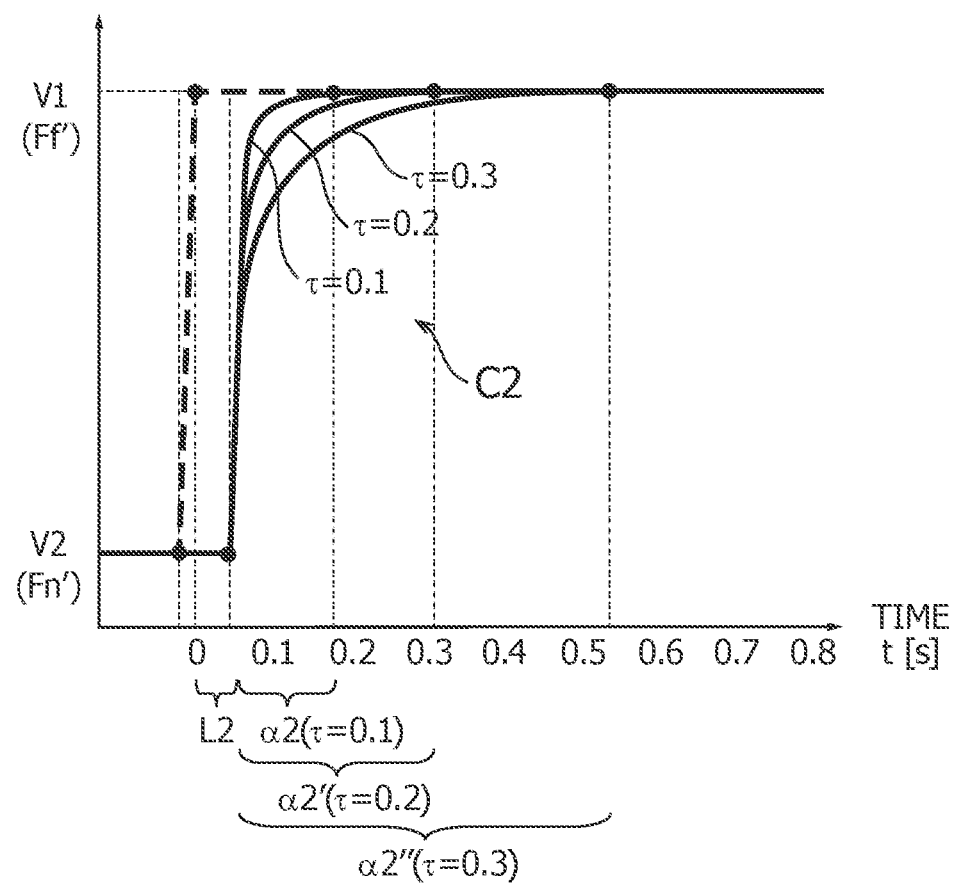
FIG. 11 is a graph exemplifying deformation in a case in which the value of the time constant of a function representing the shape of a curve in the graph of FIG. 10 is changed.

The shape of the curve C2 over the transition time period α2 is made to follow, for example, the function indicated in the Expression (1) described above, thereby allowing approximation of the temporal change in focal length by the focal point adjustment function of the eye E. When the viewpoint moves in the approaching direction as in FIG. 10, Do in the Expression (1) denotes 1/Ff, and Dt denotes 1/Fn'. The time constant τ is set in conformity with the environmental conditions and the user conditions described above. The shape of the curve C2 (the length of the transition time period α2) changes depending on the time constant τ. FIG. 11 exemplifies the change in transition time period α2 in a case in which the value of the time constant τ is changed. In the example in FIG. 11, the transition time period α2' in the case of τ=0.2 is longer than the transition time period α2 in the case in which the value of the time constant τ is τ=0.1, and furthermore, the transition time period α2" in the case of τ=0.3 is longer than the transition time period α2'. Preferably, the time constant τ in the viewpoint movement in the receding direction described above is set to be twice as large or more as the time constant τ in the viewpoint movement in the approaching direction. Specifically, it has been confirmed by experiment that it is preferable that the time constant τ in the viewpoint movement in the receding direction be set in a range from 0.05 to 0.2 (0.05< τ<0.2), and the time constant τ in the viewpoint movement in the approaching direction should be set in a range from 0 to 0.1 (0<<<0.1).

With respect to the temporal change in visibility in the movement-destination viewpoint peripheral region An described above, the temporal change in visibility in the point-before-movement viewpoint peripheral region Af, visibility starts to decrease from the first state V1 immediately after completion of the movement of the viewpoint of the user U and decreases to the second state V2 at time t3' as shown in the graph in the lower part of FIG. 10. That is, the blurring process for the image in the point-before-movement viewpoint peripheral region Af is started immediately after completion of the movement of the viewpoint of the user U. By increasing the blurring amount (blurring rate) of the image over time, the visibility in the point-before-movement viewpoint peripheral region Af transitions from the first state V1 (in-focus state) to the second state V2 (out-of-focus blurred state) in a short time period. By changing the visibility in the point-before-movement viewpoint peripheral region Af as described above, the user U can be prevented from feeling the appearance of the point-before-movement viewpoint peripheral region Af is strange.

As described above, in the virtual space image generation device 2 according to this embodiment, when the viewpoint of the user U moves, the image generation unit 14 generates the virtual space image in which the transition completion time period T1, T2 required for transition of the visibility of the visibility change region positioned around the point-before-movement viewpoint between the first state V1 and the second state V2 changes based on the predetermined condition. Accordingly, the visibility of the visibility change region transitions between the first and second states V1 and V2 over the transition completion time period T1, T2, which changes based on the predetermined condition. Accordingly, a virtual space image that achieves visibility close to that of the appearance of a real space can be generated even when the viewpoint of the user U moves. Construction of the drive simulator system 1 by applying such a virtual space image generation device 2 allows various types of objects in the real space to be reproduced in vehicle development and the like, thereby enabling the visibility of the various types of objects to be correctly evaluated on the virtual space image. By performing a vehicle drive simulation experience using the drive simulator system 1, a more realistic drive experience can be provided for the user U.

The transition completion time period T1, T2 in the virtual space image generation device 2 in this embodiment includes the delay time period L1, L2, and the transition completion time period α1, α2. In connection with the eye focal point adjustment function, a delay (time lag) occurs from movement of the viewpoint to change in focal length. In consideration of such characteristics of the eye, the delay time period L1, L2 included in the transition completion time period T1, T2 is appropriately set, and the transition time period α1, α2 is started after the lapse of the delay time period L1, L2, which can cause the visibility of the generated virtual space image to be close to that of the appearance of the real space.

According to the virtual space image generation device 2 in this embodiment, the virtual space image in which the transition time period α1, α2 changes in accordance with the movement direction of the viewpoint of the user U is generated. In connection with the eye focal point adjustment function, the focal length adjustment time period (a time period required until the eye comes into focus) varies depending on the viewpoint movement direction. Accordingly, the blurriness in the viewpoint peripheral region changes depending on the viewpoint movement direction. In conformity with such characteristics of the eye, the transition time period α1 or α2 is changed in accordance with the direction of movement of the viewpoint, which allows the visibility of the generated virtual space image to securely be close to that of the appearance of the real space.

According to the virtual space image generation device 2 in this embodiment, the virtual space image in which the transition time period α1 in the viewpoint movement in the receding direction is longer than the transition time period α2 in the viewpoint movement in the approaching direction is generated. In connection with the eye focal point adjustment function, the focal length adjustment time period in the case in which the viewpoint moves in the receding direction is longer than that in the case in which the viewpoint moves in the approaching direction. In conformity with such characteristics of the eye, the transition time period α1 or α2 in the process for the virtual space image is adjusted, which allows the visibility of the generated virtual space image to further be close to that of the appearance of the real space.

Furthermore, according to the virtual space image generation device 2 in this embodiment, the virtual space image is generated such that the transition time period α1, α2 changes in accordance with the change in focal length (Fn', Ff) of the eye of the user corresponding to the virtual position (Pn', Pf) of the viewpoint of the user U in the virtual space. In connection with the eye focal point adjustment function, the blurriness of the viewpoint peripheral region in the case in which the viewpoint moves in the real space varies depending on the amount of change in focal length. In conformity with such characteristics of the eye, the transition time period α1 or α2 in the process for the virtual space image is changed in accordance with the change in focal length of the eye, thereby allowing the visibility of the generated virtual space image to further be closer to that of the appearance of the real space.

In addition, according to the virtual space image generation device 2 in this embodiment, the virtual space image is generated such that the delay time period L1 in viewpoint movement in the receding direction is twice as long or more as the delay time period L2 in viewpoint movement in the approaching direction, and the time constant τ of the function defining the transition time period α1 in the viewpoint movement in the receding direction is twice as large or more as the time constant τ of the function defining the transition time period α2 in the viewpoint movement in the approaching direction. By configuring such settings, the visibility of the generated virtual space image can be made to further be closer to that of the appearance of the real space. In particular, in the viewpoint movement in the receding direction, the delay time period L1 is set in a range from 0.05 to 0.2 seconds, and the time constant τ is set in a range from 0.05 to 0.2, and in the viewpoint movement in the approaching direction, the delay time period L2 is set in a range from 0 to 0.05 seconds, and the time constant τ is set in a range from 0 to 0.1, thus allowing the visibility of the virtual space image to be close to that of the appearance of the real space.

According to the virtual space image generation device 2 in this embodiment, the virtual space image is generated such that the transition completion time period changes based on the condition pertaining to the environment of the virtual space (environmental condition) and the condition pertaining to the user U (user condition). In connection with the eye focal point adjustment function, the blurriness of the viewpoint peripheral region in the case in which the viewpoint moves in the real space varies depending on the environment of the virtual space (the weather, humidity, travel environment, conditions of the windshield, etc.) and the state of the user (the age, gender, eyesight, measured eye health, degree of openness of the eye, dominant eye, etc.). In conformity with such characteristics of the eye, the transition completion time period in the process for the virtual space image is changed based on the environmental condition and the user condition, thereby allowing the visibility of the generated virtual space image to effectively be closer to that of the appearance of the real space.

According to the virtual space image generation device 2 in this embodiment, when the viewpoint of the user U moves and the movement-destination viewpoint peripheral region is positioned outside of the point-before-movement viewpoint peripheral region, the virtual space image in which the transition completion time period changes based on the predetermined condition is generated. Accordingly, even when the viewpoint of the user U largely moves to a position apart outside of the viewpoint peripheral region, the visibility of the entire movement-destination viewpoint peripheral region can be made to securely be close to that of the appearance of the real space.

The embodiment of the present invention is thus described above. However, the present invention is not limited to the aforementioned embodiment, and it can be variously modified and changed based on the technical concept of the present invention. For example, in the embodiment described above, the example that the viewpoint of the user U moves in the depth direction (the receding direction or the approaching direction) in the virtual space is described. However, even in a case of the viewpoint movement accompanied by no movement in the depth direction, for example, even in a case in which the viewpoint of the user U moves between the left and right taillights of a preceding vehicle displayed in the virtual space image, application of the technique for generating the virtual space image according to the present invention can achieve a virtual space image having an appearance close to that of the real space.

In the aforementioned embodiment, the example is described where the visibility in the movement-destination viewpoint peripheral region is maintained in the second state in the period from completion of the movement of viewpoint of the user U to the elapse of the delay time period L1, L2. Alternatively, the virtual space image in which visibility slightly increases in the delay time period L1, L2 may be generated. Furthermore, in the aforementioned embodiment, the example that the temporal change in visibility in the transition time period is according to the function, such as of Expression (1). However, the visibility may be changed using a map that associates the state of the visibility and the focal length with each other.

In the case in which the temporal change in visibility in the transition time period is according to the function indicated in Expression (1), the example that the reciprocals of the virtual focal lengths Fn' and Ff of the eye E of the user U are used as the diopter Do (the reciprocal of the focal length at the start of movement of viewpoint) and the diopter Dt (the reciprocal of the focal length at the end of movement of viewpoint) in the Expression (1) is described in the aforementioned embodiment. Instead of the reciprocals of Fn' and Ff, the reciprocals of the distances Zn and Zf in the depth direction may be used.

In addition, the degree of change in visibility of the visibility change region can be changed in accordance with the difference between the focal length at the start of movement of viewpoint and the focal length at the end of movement of viewpoint.

The invention claimed is:

1. A virtual space image generation method of generating a virtual space image including a visibility change region in which a visibility changes based on movement of a viewpoint of a user, the method comprising:
generating the virtual space image in which a transition completion time period required for transition of a visibility of the visibility change region between a first state and a second state different from the first state changes based on a predetermined condition, when the viewpoint of the user moves.

2. A virtual space image generation device generating a virtual space image including a visibility change region in which a visibility changes based on movement of a viewpoint of a user, the virtual space image generation device comprising:
an image generation unit that generates the virtual space image in which a transition completion time period required for transition of a visibility of the visibility change region between a first state and a second state different from the first state changes based on a predetermined condition, when the viewpoint of the user moves.

3. The virtual space image generation device according to claim 2, wherein the transition completion time period includes a delay time period from completion of movement of the viewpoint of the user to start of the transition, and a transition time period from start to completion of the transition.

4. The virtual space image generation device according to claim 3, wherein the predetermined condition comprises a direction in which the viewpoint of the user moves, and the image generation unit is configured to generate the virtual space image in which the transition time period changes in accordance with the direction of movement of the viewpoint.

5. The virtual space image generation device according to claim 4, wherein the image generation unit is configured to generate the virtual space image in which the transition time period in a case in which the direction of movement of the viewpoint is in a receding direction is longer than the transition time period in a case in which the direction of movement of the viewpoint is in an approaching direction.

6. The virtual space image generation device according to claim 5, wherein the predetermined condition comprises a change in focal length of an eye of the user corresponds to a change in virtual position of the viewpoint of the user in a virtual space, and the image generation unit is configured to generate the virtual space image in which the transition time period changes in accordance with the change in focal length.

7. The virtual space image generation device according to claim 6, wherein the image generation unit is configured to generate the virtual space image in which the delay time period in viewpoint movement in a receding direction is twice as long or more as the delay time period in viewpoint movement in an approaching direction, and a time constant of a function defining the transition time period in the viewpoint movement in the receding direction is twice as large or more as a time constant of a function defining the transition time period in the viewpoint movement in the approaching direction.

8. The virtual space image generation device according to claim 7, wherein in the viewpoint movement in the receding direction, the delay time period is set in a range from 0.05 to 0.2 seconds, and the time constant is set in a range from 0.05 to 0.2, and in the viewpoint movement in the approaching direction, the delay time period is set in a range from 0 to 0.05 seconds, and the time constant is set in a range from 0 to 0.1.

9. The virtual space image generation device according to claim 2, wherein the predetermined condition comprises a condition pertaining to an environment of a virtual space, and the image generation unit is configured to generate the virtual space image in which the transition completion time period changes based on the condition pertaining to the environment.

10. The virtual space image generation device according to claim 9, wherein the condition pertaining to the environment of the virtual space includes weather in the virtual space.

11. The virtual space image generation device according to claim 9, wherein the condition pertaining to the environment of the virtual space includes a travel environment in the virtual space.

12. The virtual space image generation device according to claim 9, wherein the condition pertaining to the environment of the virtual space includes conditions of a windshield in the virtual space.

13. The virtual space image generation device according to claim 2, wherein the predetermined condition comprises a condition pertaining to the user, and the image generation unit is configured to generate the virtual space image in which the transition completion time period changes based on the condition pertaining to the user.

14. The virtual space image generation device according to claim 13, wherein the condition pertaining to the user includes a value acquired by preliminarily performing an experiment on a subject assumed to be the user.

15. The virtual space image generation device according to claim 13, wherein the condition pertaining to the user includes an age of the user.

16. The virtual space image generation device according to claim 13, wherein the condition pertaining to the user includes eyesight, measure of health of an eye, and degree of opening of the eye of the user.

17. The virtual space image generation device according to claim 2, wherein the image generation unit is configured to generate the virtual space image in which the transition completion time period changes based on the predetermined condition, when the viewpoint of the user moves and a movement-destination viewpoint peripheral region is positioned outside of a point-before-movement viewpoint peripheral region.

18. The virtual space image generation device according to claim 2, wherein the virtual space image generation device is applied to a drive simulator system.

* * * * *